United States Patent [19]

Butti et al.

[11] 3,900,458

[45] Aug. 19, 1975

[54] MIXED SALTS OF POLSULFURIC ESTERS OF NATURALLY OCCURRING GLYCOPEPTIDES WITH METALS AND ORGANIC BASES, AND PROCESS FOR PRODUCING SAME

[75] Inventors: Adriano Butti, Como; Giuseppe Prino, Milan, both of Italy

[73] Assignee: Crinos Industria Farmacobiologica S.p.A., Villa Guardia, Italy

[22] Filed: Mar. 22, 1974

[21] Appl. No.: 453,765

[30] Foreign Application Priority Data

Mar. 27, 1973 Italy.................................. 22122/73

[52] U.S. Cl............... 260/112 R; 424/104; 424/177
[51] Int. Cl.²........................................... C07G 7/04
[58] Field of Search ................................ 260/112 R

[56] References Cited
UNITED STATES PATENTS

| | | | |
|---|---|---|---|
| 3,518,243 | 6/1970 | Butti et al. ...................... | 260/112 R |
| 3,607,650 | 9/1971 | Bertellini et al. ................ | 260/112 R |

OTHER PUBLICATIONS

Eur. J. Pharmacol., 15, pp. 119–126, Prino et al.
Eur. J. Pharmacol., 17, pp. 279–282, (1972), Prino et al.
Am. J. Dig. Disease, 17, pp. 863–867, (1972), Prino et al.

*Primary Examiner*—Howard E. Schain
*Attorney, Agent, or Firm*—Browdy and Neimark

[57] ABSTRACT

Mixed salts of sulfoglycopeptides with metals and nitrogen-containing organic bases having spasmolytic and anticholinergic activity, are synergistically endowed with antisecretory, antipeptic, spasmolytic and anticholinergic properties in comparison with the pharmaceutical properties individually shown by the sulfoglycopeptide and organic base moieties. The process for preparing the mixed salts comprises mixing an aqueous solution of a sulfoglycopeptide in the acid form with an aqueous solution of an alkali or alkaline-earth (preferably sodium) salt of sulfoglycopeptide and thereafter mixing the solution thus obtained with a solution of the organic base.

20 Claims, No Drawings

MIXED SALTS OF POLSULFURIC ESTERS OF NATURALLY OCCURRING GLYCOPEPTIDES WITH METALS AND ORGANIC BASES, AND PROCESS FOR PRODUCING SAME

BACKGROUND OF THE INVENTION

1. Field of the Invention

The present invention relates to a group of novel mixed salts of polysulfuric esters of naturally occurring glycopeptides with metal and organic bases, and to a process for preparing same.

2. Description of the Prior Art

The U.S. Pat. 3,518,243 discloses a process for sulfonating glycopeptides of animal origin, thus obtaining sulfoglycopeptides (hereinafter referred to as SGLP). This patent also discloses that the alkali, alkaline-earth, and heavy metal salts of SGLP, are useful as drugs, for instance in the treatment of inflammatory diseases and particularly in the treatment of arthroses and gastric ulcers. These salts, especially the alkaline-earth metal salts, are however somewhat toxic and consequently special precautions are to be taken to reduce their toxicity, when these salts are used for therapeutic purposes.

In the copending U.S. Pat. application Ser. No. 405,179 filed Oct. 10, 1973 and assigned to the same assignee as this application, there have been disclosed salts of sulfoglycopeptides with metals and aminoacids, which salts are endowed with anti-inflammatory, cicatrizing, anti-secretory and anti-peptic properties, which make them particularly useful in the treatment of gastro-duodenal diseases. The salts disclosed in the above identified patent application are substantially non-toxic and present an anti-inflammatory activity higher than that of the SGLP salts disclosed in the U.S. Pat. 3,518,243.

The salts disclosed in the foregoing patent application are however ineffective on the peripheral nervous system and are consequently poorly active on the symptomatology of the aforementioned diseases, and particularly against the painful spasms which periodically accompany the gastro-duodenal diseases. So for instance, it is known that the sulfoglycopeptide sodium salt, while active in inhibiting both the experimentally-induced ulcers, the activity of gastroproteases and the acidic secretion of gastric juice, does not alter however the intestinal contracttility and is ineffective on the peripheral nervous system (see Prino et al., Eur. J. Pharmacol 15, 199–126, 1971; Prino et al., Arzneim-Forsch., 21, 918–921, 1971; Prino et al., Eur. J. Pharmacol, 17, 279–282, 1972; Prino et al., Am. J. Dig. Dis., 17, 863–867, 1972).

SUMMARY OF THE INVENTION

It has now been found and is an object of this invention that it is possible to obtain from the aforementioned sulfoglycopeptides also salts with amino or ammonium bases of natural or synthetic origin having spasmolytic and anti-cholinergic activity. These salts have been found to synergistically combine the anti-secretory, anti-peptic and protective action shown by sulfoglycopeptides, with the spasmolytic and anti-secretory activity shown by the bases to such an extent that the amount of both SGLP and base components present in the mixed salt is far lower than the amount of the same components when used separately, with a view to obtaining the same therapeutic result. Remarkable importance is to be attached to such synergistic effect, if it is taken into account that drugs of this type are often used in long-term treatments and that anticholinergic agents show, at the doses currently used noticeable, generally undesired, side-effects.

It has further been found that the mixed salts in accordance with this invention are far less toxic than the corresponding amount of the base contained in the same salt. Consequently it was not possible to obtain an evaluation for $LD_{50}$, since at the maximum dose which was orally administrable to rats, a mortality ranging from 10 to 16% only depending on the specific salt, was obtained.

In accordance with this invention there is provided a water-soluble salt, wherein the anionic moiety is a sulfoglycopeptide polyanion and the cationic moiety is formed by:

a. a metal cation selected from the group consisting of the alkali and alkaline-earth metal cations; and b. a nitrogen-containing organic cation derived from an organic base having spasmolytic and anti-cholinergic activities.

The invention also provides a process for producing the foregoing mixed salt, which comprises mixing a solution of a sulfoglycopeptide in its acid form with a solution of an alkali or alkaline-earth metal salt of a sulfoglycopeptide; and mixing the solution thus obtained with a solution of a nitrogen-containing organic base having spasmolytic and anti-cholinergic activity to salify said acid sulfoglycopeptide, thus obtaining a solution of the mixed salt.

DESCRIPTION OF THE PREFERRED EMBODIMENTS

As aforementioned, in the course of experimental tests relating to the anti-secretory and anti-ulcer activity, a higher synergistic activity of the salts of this invention in comparison with the single SGLP and base components, has been shown. Particularly those salts, which contain from about 5 to about 20% by weight of base component, were shown to inhibit experimentally-induced ulcers and secretion of acidic gastric juice to a larger extent than the sum of the activities shown by the base and sulfoglycopeptide separately administered. In the course of other tests it was shown that the specific activities of the salt components, such as the anti-peptic activity of the sulfoglycopeptide and the anti-cholinergic and spasmolytic activity of the bases, were not modified.

Preferred, although non-limiting examples of the aforementioned organic bases are: atropine, hyoscine, anisotropine and papaverine. Among the metal cations, sodium is particularly preferred.

To obtain the mixed salts of this invention, a portion only of the acidic functions present in sulfoglycopeptide macromolecules is salified with the organic cations deriving from the aforementioned bases, while the remaining functions are kept linked by means of ionic bonds to metal ions, preferably sodium.

The preparation of the mixed salts in accordance with this invention is carried out by first completely freeing all the acidic functions of a predetermined amount of sulfoglycopeptide and mixing the free acid thus obtained with an aqueous solution containing such an amount of the metal (e.g. sodium) salt of sulfoglycopeptide as to reach the percentage of free acid functions corresponding to the desired concentration.

The solution thus obtained is then mixed with that amount of base, which is necessary to neutralize said free acid functions. On evaporation of the solution, the salts according to this invention are obtained.

In order to produce the sulfoglycopeptide in its free acid form from its metal (e.g. sodium) salt as well as to free the organic bases having sympathicolytic-like activity from their salts, it is particularly advantageous to use cationic and anionic ion-exchange resins, such as for instance those commercially known under the tradename AMBERLITE IR 120 (cationic resin) and AMBER-LITE IRA 410 (anionic resin). The use of such resins can be limited however to the treatment of the sulfoglycopeptide salt, because the aforementioned bases can everytime be obtained also by means of conventional methods, as for instance by treating the aqueous solutions of salts thereof with alkalies having suitable strength (sodium carbonate, ammonia, sodium hydroxide, etc). The bases are also commercially available as free bases.

In case the free bases one intends to use are not water-soluble, their preparation and salification reaction with the solution of the partially desalified sulfo-glyco-peptide is suitably carried out in the presence of a solvent.

The most suitable solvents are the water-miscible lower alcohols and ketones. Particularly preferred are ethanol, methanol and the solutions of 20 to 80% acetone in water.

The invention shall be further described in the following examples which are given by way of non-limiting illustration of the invention.

Preparation of the Mixed Salts

EXAMPLE 1

Atropine-sodium Salt of Sulfoglycopeptide 3.754 grams of the sulfoglycopeptide sodium salt obtained by the process disclosed in the U.S. Pat. No. 3,518,243 and having the following characteristics:

| | | |
|---|---|---|
| S | 14.65 | % |
| N | 3.05 | % |
| Na | 10.63 | % |
| Hexosamines | 18 | % |
| Hexoses | 14 | % |
| Proteins | 8.8 | % |
| Acetyl groups | 4.7 | % | were dissolved in 187cc of distilled water and the solution was percolated through a column containing a bed of a strong cationic resin (AMBERLITE IR 120 H$^+$). The percolate was collected in a solution of 41.590 grams of the same sulfoglycopeptide sodium salt previously used, dissolved in 208cc of distilled water. The resin bed was washed with 100cc of distilled water and the washing waters were combined with the preceding solution, thus obtaining a solution having an overall volume of 480cc and a pH value of about 2. A solution of 5 grams of atropine base dissolved in 50cc of 95% ethanol were added to this solution. On completion of the addition a substantially neutral pH value was obtained. The solution was finally evaporated under reduced pressure, yielding 48 grams of the atropine-sodium salt of sulfoglycopeptide having the following characteristics:

| | | |
|---|---|---|
| Moisture | 5.20 | % |
| S | 12.64 | % |
| N | 2.83 | % |
| Hexoses | 10.0 | % |
| Hexosamines | 16.6 | % |
| Aminoacids | 8.1 | % |
| Na | 8.28 | % |
| Atropine base | 10.3 | % |

The mixed salt thus obtained was water-soluble even at room-temperature and soluble in 50% ethanol.

EXAMPLE 2

N-butyl-hyoscineammonium-sodium salt of sulfoglycopeptide 1.0 gram of the sodium salt of the sulfoglycopeptide of Example 1 was dissolved in 50cc of distilled water and the solution was percolated through a column containing a bed of a strong cationic resin (AMBERLITE IR 120 H$^+$). The percolate was collected in a solution of 7.464 grams of the same sulfoglycopeptide sodium salt in 37cc of distilled water. The resin bed was washed with 100cc of distilled water and the washing waters were combined with the previously obtained solution, thus obtaining a solution having an overall volume of 190cc and a pH value of about 2.5.

A solution of 2 grams of hyoscine butylbromide in 50cc of distilled water was separately treated with a strong anionic resin (AMBERLITE IRA 410 OH$^-$), and the percolate, after addition to the washing waters from the resin, was mixed under vigorous stirring with the aforementioned acidic solution, thus obtaining on completion of the addition 320cc of a solution having a pH of 6.

On evaporation under reduced pressure, 9 grams of N-butyl-hyoscineammonium-sodium salt of sulfoglycopeptide having the following characteristics, were obtained:

| | | |
|---|---|---|
| Moisture | 3.20 | % |
| S | 12.78 | % |
| N | 3.40 | % |
| Na | 8.18 | % |
| Butyl-hyoscine base | 16.35 | % |
| Total hexoses | 10.1 | % |
| Total hexosamines | 16.8 | % |
| Aminoacids | 8.2 | % |

The mixed salt thus obtained was water-soluble at room temperature and substantially insoluble in 80% ethanol.

EXAMPLE 3

8-methyltropinium 3-(2'-propyl)pentanoate sodium salt of sulfo-glycopeptide (shortly referred to as SGLP/Na/Anisotropine).

3.027 grams of the same sulfoglycopeptide sodium salt of Example 1 were dissolved in 151cc of distilled water and the solution thus obtained was percolated through a column containing a bed of a strong cationic resin (AMBERLITE IR 120 H$^+$). The percolate was collected in a solution of 43.380 grams of the same SGLP sodium salt in 216cc of distilled water. The resin bed was washed with 150cc of distilled water and the washing waters were combined with the previously obtained solution, thus obtaining a solution having an overall volume of 520cc and a pH value of 2.8

A solution of 5 grams of anisotropine methylbromide, i.e. 8-methyltropinium bromide 3-(2'-propyl)pentanoate, in 100cc of distilled water was percolated through a strong anionic resin (AMBERLITE IRA 410 OH⁻). The resin was then washed with 150cc of distilled water. The percolate was added to the washing waters from the resin, giving a solution having a pH value of 11 and an overall volume of 250cc. This solution was mixed under vigorous stirring with the aforementioned acidic solution thereby obtaining, on completion of the addition, a clear solution having a pH value of 5.5 and a volume of 780cc.

On evaporation under reduced pressure, 48 grams of the 8-methyltropinium 3-(2'-propyl)pentanoate sodium salt of SGLP having the following characteristics, were obtained:

| | | |
|---|---|---|
| Moisture | 6.70 | % |
| S | 12.82 | % |
| N | 3.07 | % |
| Na | 8.6 | % |
| Hexoses | 10.2 | % |
| Hexosamines | 16.8 | % |
| Aminoacids | 8.2 | % |
| 8-methyltropinium hydroxide 3-(2'propyl) pentanoate (shortly referred to as anisotropine base | 7.8 | % |

The mixed salt thus obtained was completely water-soluble at room temperature and soluble in 50% ethanol.

EXAMPLE 4

Papaverine Sodium Salt of Sulfoglycopeptide.

1.457 grams of the same SGLP sodium salt of Example 1 were dissolved in 73cc of distilled water and the solution was percolated through a column containing a bed of a strong cationic resin (AMBERLITE IR 120 H⁺). The percolate was collected in a solution of the same SGLP sodium salt (21.432 grams) dissolved in 107cc of distilled water. The resin bed was washed with 150cc of distilled water and the washing waters were combined with the previously obtained solution, thus obtaining a solution having an overall volume of 350cc and a pH value of 2.8. This solution was mixed with a hydro-alcoholic solution obtained by percolating 2.5 grams of papaverine hydrochloride dissolved in 50cc of 50% ethanol through a bed of a strong anionic resin (AMBERLITE IRA 410 OH⁻) and thereafter washing the resin with 150cc of 50% ethanol.

By combining the two solutions, a solution having an overall volume of approximately 500cc and a pH value of about 5.2 was obtained. This solution was subsequently evaporated under reduced pressure, thus yielding 24 grams of the papaverine sodium-salt of sulfoglycopeptide having the following characteristics:

| | | |
|---|---|---|
| Moisture | 2.5 | % |
| S | 13.00 | % |
| N | 2.92 | % |
| Na | 8.7 | % |
| Total hexoses | 10.4 | % |
| Total hexosamines | 17.0 | % |
| Aminoacids | 8.3 | % |
| Papaverine base | 9.0 | % |

The mixed salt thus obtained was water-soluble at room temperature.

EXAMPLE 5

4-amino-5-chloro-[2(diethylamino)ethyl]-2-methoxy-benzamide and sodium sulfoglycopeptide mixed salt.

7.310 grams of SGLP sodium salt of Example 1 were dissolved in 365cc of distilled water and the solution thus obtained was percolated through a column containing a bed of a strong cationic resin (AMBERLITE IR 120 H⁺). The percolate was collected in a solution of 37.500 grams of the same SGLP sodium salt in 174cc of distilled water. The resin bed was washed with 150cc of distilled water and the washing waters were combined with the previously obtained solution, thus giving 700cc of a solution having a pH value of 1.5.

This solution was mixed with a hydroalcoholic solution obtained by percolating 10 grams of 4-amino-5-chloro-[2-(diethylamino)ethyl]-2-methoxy-benzamide-monohydrochloride dissolved in 100cc of 96% ethanol through a bed of a strong anionic resin (AMBERLITE IRA 410 OH⁻) and thereafter washing the resin with moderately warm (40°C) 80% ethanol.

By combining the two solutions, a solution having a volume of about 1300cc and a pH value of about 5.2 was obtained. This solution was then evaporated under reduced pressure, yielding 49 grams of 4-amino-5-chloro-[2-(diethylamino)ethyl]-2-methoxy-benzamide and sodium sulfoglycopeptide mixed salt, having the following characteristics:

| | | |
|---|---|---|
| Moisture | 4.2 | % |
| S | 13 | % |
| N | 4.43 | % |
| Sialic acid | 1.7 | % |
| Total hexoses | 9.5 | % |
| Total hexosamines | 15.5 | % |
| Aminoacids | 7.6 | % |
| 4-amino-5-chloro-[2-(diethylamino)ethyl] 2-methoxy-benzamide base | 17.6 | % |
| Na | 7.98 | % |

The mixed salt thus obtained was completely soluble at room temperature in water and 50% ethanol.

Pharmacological Tests

In order to show the pharmacological activity of the SGLP mixed salt in accordance with this invention, there are hereby disclosed, as non-limiting examples, some results obtained with the anisotropine-sodium salt of sulfoglycopeptide (SGLP/Na/anisotropine), which has been tested on rats in a number of pharmacological tests, in comparison with the results shown by anisotropine methylbromide (8-methyltropinium bromide 3-(2'-propyl)pentanoate), and the sodium salt of sulfoglycopeptide (SGLP/Na).

It has been found that the anisotropine salt of sulfoglycopeptide is very slightly toxic to rat after oral administration; when expressed as anisotropine content, a remarkable decrease in this drug toxicity is observed (Table 1).

A number of pharmacological tests have shown an enhancement of the mixed salt activity over the single salt components: this phenomenon is particularly apparent in the treatment of ulcer caused by pylorus ligature (Table II), restraint ulcer (Table III), and the acidic secretion of gastric juice (Table IV and V).

A number of different tests have shown that some SGLP and anisotropine pharmacological activities are maintained in the mixed salt: for instance, the anisotropine activity on intestinal hypermotility induced by a cholinergic stimulus (Table VI), or on the acetylcholine-induced spasm in guinea pig's isolated ileus are quantitatively maintained in the mixed salt; also the anti-peptic activity of SGLP is not altered by the anisotropine presence in the mixed salt (Table VII).

oral administration to rats of SGLP sodium salt, N-methyl octatropinium bromide and anisotropine-sodium mixed salt of sulfoglycopeptide (containing 15.6% of anisotropine base).

| No. of rats | Treatment | Oral dose | Ulcer ± SE score mean | Inhib. | P |
|---|---|---|---|---|---|
| 30 | Saline solution | 10ml/kg | 3.17 ± 0.39 | — | — |
| 30 | SGLP/Na | 25mg/kg | 2.40 ± 0.39 | 24.3 | NS |
| 30 | Anisotropine methylbromide | 5mg/kg | 2.05 ± 0.38 | 35.3 | 0.05 |
| 30 | SGLP/Na//Anisotropine | 30mg/kg | 1.25 ± 0.28 | 60.6 | 0.001 |

TABLE I

Acute toxicity after oral administration to rats (which have been kept under observation for 10 days) of SGLP sodium salt, anisotropine methyl-bromide and anisotropine-sodium mixed salt of sulfoglycopeptide (containing 15.6% of anisotropine base.)

TABLE III

Inhibition of restraint-induced ulcer in rats after oral administration of SGLP sodium salt, anisotropine methylbromide and anisotropine-sodium mixed salt of sulfoglycopeptide (containing 7.8% of anisotropine base).

| No.of rats | Treatment | Oral dose | Ulcer ± SE score mean | Inhib. | P |
|---|---|---|---|---|---|
| 30 | Saline solution | 10mg/kg | 3.30 ± 0.28 | — | — |
| 30 | SGLP/Na | 180mg/kg | 2.96 ± 0.35 | 10.4 | NS |
| 30 | Anisotropine methylbromide | 20mg/kg | 1.96 ± 0.30 | 40.6 | <0.005 |
| 30 | SGLP/Na/Anisotropine | 200mg/kg | 1.26 ± 0.28 | 61.8 | <0.001 |

| Substance | $LD_{50}$ and confidence limits |
|---|---|
| SGLP/Na | non-toxic at 4g/kg |
| Anisotropine methyl-bromide | 794 (684–921) mg/kg |
| SGLP/Na//Anisotropine | non-toxic at 4g/kg |

TABLE IV

Effect on basal gastric secretion of rats which have been orally administered with SGLP sodium salt, anisotropine methylbromide and anisotropine-sodium mixed salt of sulfoglycopeptide (containing 15.6% of anisotropine base).

A) Acidity inhibition of ligature-induced gastric secretion.

| No.of rats | Treatment | Oral dose | $H^+mEq/1h$ | Inhib. % | P |
|---|---|---|---|---|---|
| 24 | Saline solution | 2ml/kg | 1.31 ± 0.16 | — | — |
| 24 | SGLP/Na | 40mg/kg | 1.21 ± 0.16 | 7.6 | NS |
| 24 | Anisotropine methylbromide | 10mg/kg | 0.85 ± 0.2 | 35.1 | NS |
| 24 | SGLP/Na//Anisotropine | 50mg/kg | 0.33 ± 0.04 | 74.8 | <0.001 |

TABLE II
Inhibition of ulcer caused by pylorus ligature after

B) Inhibition of the amount of gastric secretion after ligature.

| No.of rats | Treatment | Oral dose | Volume ml/1h | Inhib. % | P |
|---|---|---|---|---|---|
| 24 | Saline solution | 2ml/kg | 1.59 ± 0.1 | — | — |
| 24 | SGLP/Na | 40mg/kg | 1.65 ± 0.1 | +3.8 | NS |
| 24 | Anisotropine methylbromide | 10mg/kg | 1.28 ± 0.2 | 19.5 | NS |
| 24 | SGLP/Na/Anisotropine | 50mg/kg | 0.89 ± 0.07 | 44.02 | <0.001 |

TABLE V

Inhibition of acid gastric secretion induced by pentagastrine (80 μg/kg i.v.) in rats which have been orally administered with SGLP sodium salt, anisotropine methylbromide and anisotropine-sodium mixed salt of sulfoglycopeptide (containing 7.8% of anisotropine base).

| No.of rats | Treatment | Oral dose | $H^+$mEq/1h mean ± SE | % Inhib. | P |
|---|---|---|---|---|---|
| 20 | Saline solution (no pentagastrine) | 2ml/kg | 0.72 ± 0.10 | — | — |
| 20 | Physiological solution | 2ml/kg | 1.64 ± 0.22 | — | — |
| 20 | SGLP/Na | 90mg/kg | 0.80 ± 0.14 | 51.2 | <0.01 |
| 20 | Anisotropine methylbromide | 10mg/kg | 1.34 ± 0.16 | 18.5 | NS |
| 20 | SGLP/Na/ /Anisotropine | 100mg/kg | 0.37 ± 0.07 | 77.4 | <0.001 |

TABLE VI

Activity of SGLP sodium salt, anisotropine methylbromide and anisotropine-sodium mixed salt of sulfoglycopeptide (containing 15.6% of anisotropine base) on methacholine-induced gastrointestinal motility of rats (2mg/kg s.c.)

| No.of rats | Treatment | Oral dose | Run of coal suspension(cm.) Average ±SE | % Inhib. | P |
|---|---|---|---|---|---|
| 20 | Saline solution (no methacholine) | 5ml/kg | 54.97 ± 1.2 | — | — |
| 20 | Physiological solution | 5ml/kg | 87.41 ± 1.9 | — | — |
| 20 | SGLP/Na | 40mg/kg | 83.48 ± 2.4 | 4.5 | NS |
| 20 | Aninsotripine methylbromide | 10mg/kg | 52.1 ± 2.7 | 40.4 | <0.001 |
| 20 | SGLP/Na/ /Anisotropine | 50mg/kg | 51.3 ± 2.4 | 41.3 | <0.001 |

TABLE VII

Anti-peptic activity of SGLP sodium salt, anisotropine methylbromide and anisotropine-sodium mixed salt of sulfoglycopeptide (containing 7.8% of anisotropine base). Pylorus ligature was maintained for 5 hours and the treatment was started immediately after ligature.

| No.of rats | Treatment | Oral dose | Peptic activity (μ mole of tyrosine) | Inhib. % | P |
|---|---|---|---|---|---|
| 20 | Saline solution | 2ml/kg | 62.5 ± 5.4 | — | — |
| 20 | SGLP/Na | 80mg/kg | 37.7 ± 5.6 | 39.7 | <0.01 |
| 20 | Anisotripine methylbromide | 8.8mg/kg | 52.3 ± 7.2 | 16.3 | NS |
| 20 | SGLP/Na /Anisotropine | 88.8mg/kg | 32.3 ± 4.6 | 48.3 | <0.001 |

Modifications and/or changes may be made by those skilled in the art to the process and mixed salts according to this invention, without departing from the scope and spirit thereof.

What we claim is:

1. A process for the preparation of a mixed salt, wherein the anionic moiety is a sulfoglycopeptide polyanion and the cationic moiety is:
   a. a metal cation selected from the group consisting of the alkali metal and alkaline-earth metal cations;

and b. a nitrogen-containing organic cation which is the cation of an organic base having spasmolytic and anticholinergic activities;

which process comprises:
   1. mixing a solution of a sulfoglycopeptide in its acid form with a solution of an alkali metal or alkaline-earth metal salt of a sulfoglycopeptide;
   2. mixing the solution thus obtained with a solution of a nitrogen-containing organic base, having spasmolytic and anti-cholinergic activity, in a solvent, to salify said acid sulfoglycopeptide, thus obtaining a solution of the mixed salt; and
   3. separating the mixed salt from the solvent.

2. The process of claim 1, wherein said separating step comprises subjecting the solution of the mixed salt to evaporation under reduced pressure.

3. The process of claim 1, wherein the amount of said base, which is necessary to salify said acid sulfoglycopeptide is from about 5 to about 20% by weight of the mixed salt.

4. The process of claim 1, wherein said base is atropine.

5. The process of claim 1, wherein said base is anisotropine.

6. The process of claim 1, wherein said base is anistropine.

7. The process of claim 1, wherein said base is papaverine.

8. The process of claim 1, wherein the solvent for said base is water.

9. The process of claim 1, wherein the solvent for said base is a water-miscible solvent.

10. The process of claim 9, wherein said water-miscible solvent is a lower aliphatic alcohol.

11. The process of claim 10, wherein said alcohol is methanol or ethanol.

12. The process of claim 9, wherein said water-miscible solvent is a lower aliphatic ketone.

13. The process of claim 12, wherein said ketone is acetone.

14. A mixed sulfoglycopeptide salt obtained by the process of claim 1.

15. The salt of claim 14, which is the alkali metal or alkaline-earth metal and papaverine salt of sulfoglycopeptide.

16. The salt of claim 14, which is the alkali metal or alkaline-earth metal and hyoscine salt of sulfoglycopeptide.

17. The salt of claim 14, which is the alkali metal or alkaline-earth metal and atropine salt of sulfoglycopeptide.

18. The salt of claim 14, which is the alkali metal or alkaline-earth metal and anisotropine salt of sulfoglycopeptide.

19. The mixed salt of claim 14, wherein the content of said organic base is from about 5 to about 20% by weight.

20. The mixed salt of claim 14, wherein said metal cation is sodium.

* * * * *